(12) United States Patent
Gethmann

(10) Patent No.: US 6,416,268 B2
(45) Date of Patent: Jul. 9, 2002

(54) MECHANICAL FASTENING APPARATUS

(75) Inventor: Douglas P. Gethmann, Gladbrook, IA (US)

(73) Assignee: Fisher Controls International, Inc., Austin, TX (US)

(*) Notice: Subject to any disclaimer, the term of this patent is extended or adjusted under 35 U.S.C. 154(b) by 0 days.

(21) Appl. No.: 09/788,745

(22) Filed: Feb. 20, 2001

Related U.S. Application Data

(62) Division of application No. 09/552,443, filed on Apr. 19, 2000, now Pat. No. 6,213,150.

(51) Int. Cl.$^7$ .......................... F16B 19/00; F16B 21/00
(52) U.S. Cl. ..................... 411/338; 411/265; 411/354; 411/427
(58) Field of Search ............................. 411/60.1, 60.2, 411/265, 338, 339, 354, 427, 429

(56) References Cited

U.S. PATENT DOCUMENTS

| | | | |
|---|---|---|---|
| 1,445,074 A | * 2/1923 | Dowling | 411/265 X |
| 1,747,082 A | * 2/1930 | Reuter | 411/265 |
| 1,847,937 A | * 3/1932 | Fetters | 411/60.2 |
| 2,633,735 A | * 4/1953 | Dondero | 411/427 X |
| 4,169,630 A | * 10/1979 | Wagner | 411/427 X |
| 4,456,033 A | 6/1984 | Kay et al. | |
| 5,004,361 A | 4/1991 | Winnie | |
| 6,026,859 A | 2/2000 | Wears et al. | |

FOREIGN PATENT DOCUMENTS

| | | |
|---|---|---|
| DE | 24 48 295 A | 4/1976 |
| DE | 42 22 248 A | 1/1994 |
| GB | 2 070 190 A | 9/1981 |

* cited by examiner

*Primary Examiner*—Neill Wilson
(74) *Attorney, Agent, or Firm*—Marshall, Gerstein & Borun

(57) ABSTRACT

A taper nut retention device mechanically fastens a plurality of pressure reduction disks. A cage end member at one end of the stacked disks has a series of counterbores, each aligned with respective mounting holes in each disk. A second cage end member at the other end of the stack has a series of inwardly converging, tapered bores with shallow taper angles, each aligned with respective mounting holes and a counterbore. A taper nut with a threaded interior and an outer tapered surface with a shallow taper angle matching the tapered bore is inserted into and engageably contacts the tapered bore. A threaded bolt is inserted into the counterbore and through the disk mounting holes to threadably engage the taper nut. Tightening of the bolt and nut mechanically secures the stacked disk assembly. A process for making the stacked disk assembly wherein each disk and the cage end members are plated with nickel and the components are fused together in a brazing oven. The taper nuts are then inserted in each tapered bore and engaged with a threaded bolt.

3 Claims, 2 Drawing Sheets

MECHANICAL FASTENING APPARATUS

This is a divisional of U.S. application Ser. No. 09/552,443, filed Apr. 19, 2000, now U.S. Pat. No. 6,213,150.

BACKGROUND OF THE INVENTION

In the control of fluid in industrial processes, such as oil and gas pipeline systems, chemical processes, etc., it is often necessary to reduce the pressure of a fluid. Adjustable flow restriction devices such as flow control valves and fluid regulators and other fixed fluid restriction devices such as diffusers, silencers, and other back pressure devices are utilized for this task. The purpose of the fluid control valve and/or other fluid restricting device in a given application may be to control flow rate or other process variables, but the restriction induces a pressure reduction inherently as a by-product of its flow control function.

Currently there is available an assembly of a plurality of stacked disks forming a fluid pressure reduction device fused together in a brazing process with additional mechanical fasteners added if desired to securely maintain the stacked disks assembled. As an example, in U.S. Pat. No. 6,026,859, assigned to the same assignee as herein, a plurality of stacked disks include alternating flow disks and plenum disks. Respective cage ends are provided on opposite ends of the stacked disks. One of the cage ends includes a series of threaded bores and the opposite cage end includes a corresponding number of countersunk bores. A corresponding number of holes are drilled, cut or punched through each disk so that in the assembled stacked disks configuration, each disk hole can be aligned with a respective threaded bore in one cage end and with a respective countersunk bore in the opposite cage end. In the final assembly, a threaded bolt is inserted through the one cage end and through the disks to threadably engage the threaded bore in the opposite cage end.

In the manufacturing process for this stacked disk assembly, each individual disk and the cage ends are coated with a nickel plating. The nickel plated disks and the cage ends are assembled into a stack which is placed in a fixture and subjected to a suitable temperature in an oven during a brazing process to fuse the individual plated disks to each other as well as to the opposite cage ends.

Problems have been encountered in thereafter attempting to threadably engage the threaded bolt with the threaded bore in the cage end due to the nickel in the brazing process being deposited into the threads of the threaded bore. Various attempts have been made to prevent the nickel from being deposited onto the threads in the cage end threaded bores, all of which attempts have met with limited success. Thus, despite various efforts the final assembly problem in trying to provide a mechanical fastening of the stacked disks still exits.

Other problems encountered are due for instance to distortion in the threads caused by the high temperatures in the brazing oven. Thread distortion may cause increased difficulty in assembly, overtorqueing of the threaded bolt, and insufficient bolt load.

SUMMARY OF THE INVENTION

In accordance of the principles of the present invention, there is provided a stacked disk configuration and a process for assembling the stacked disks so that the stacked disks are not only fused together in the desired brazing process, but are also mechanically fastened together with threaded bolts to securely and reliably maintain the stacked disks assembled.

In the present invention, one cage end mounting member is provided with a series of inwardly converging, tapered bores and the other cage end mounting member is provided with a corresponding number of conventional countersunk bores. The disks and the cage end mounting members are nickel plated, subjected to a brazing process as in the prior process to fuse the disks and the cage ends to each other. A taper nut having internal threads and an external tapered surface with a taper angle which matches the inwardly converging tapered bore of the cage end mounting member is then inserted into each of the tapered bores.

A threaded bolt is inserted in each of the countersunk bores, and through corresponding aligned holes in each disk to threadably engage the taper nut. Continued threadable engagement of the bolt and the taper nut tends to pull the taper nut deeper into each inwardly converging, tapered bore and is continued until the desired torque amount is achieved. The taper nut is thereby self-locked in the tapered bore so that even if the threaded bolt is disengaged from the nut, the taper nut remains in the tapered bore.

The present invention thereby provides a unique taper nut retention device to mechanically fasten the stacked disks. Also, the present invention provides an improved process for assembling and mechanically fastening a plurality of fluid pressure reduction disks.

The present invention also may be utilized where the mounting members are of a material which is difficult to tap or otherwise form threads. Also, where the fastener cannot be allowed to extend beyond the outer dimensions of the mounting members, or where there are tight dimensions and a wrench can't be used on a normal nut, a tapered bore in one mounting member can be formed and a taper nut dropped into the tapered bore.

A shallow taper angle of less than 30 degrees, and most preferably about five degrees is preferred, particularly so that the self-locking feature can be readily attained between the taper nut and the tapered bore of the mounting member. A significant advantage of the taper nut feature of this invention is that no welding of the nut is required to keep the nut in place during initial threadable engagement of the bolt or when the bolt is disengaged from the taper nut.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
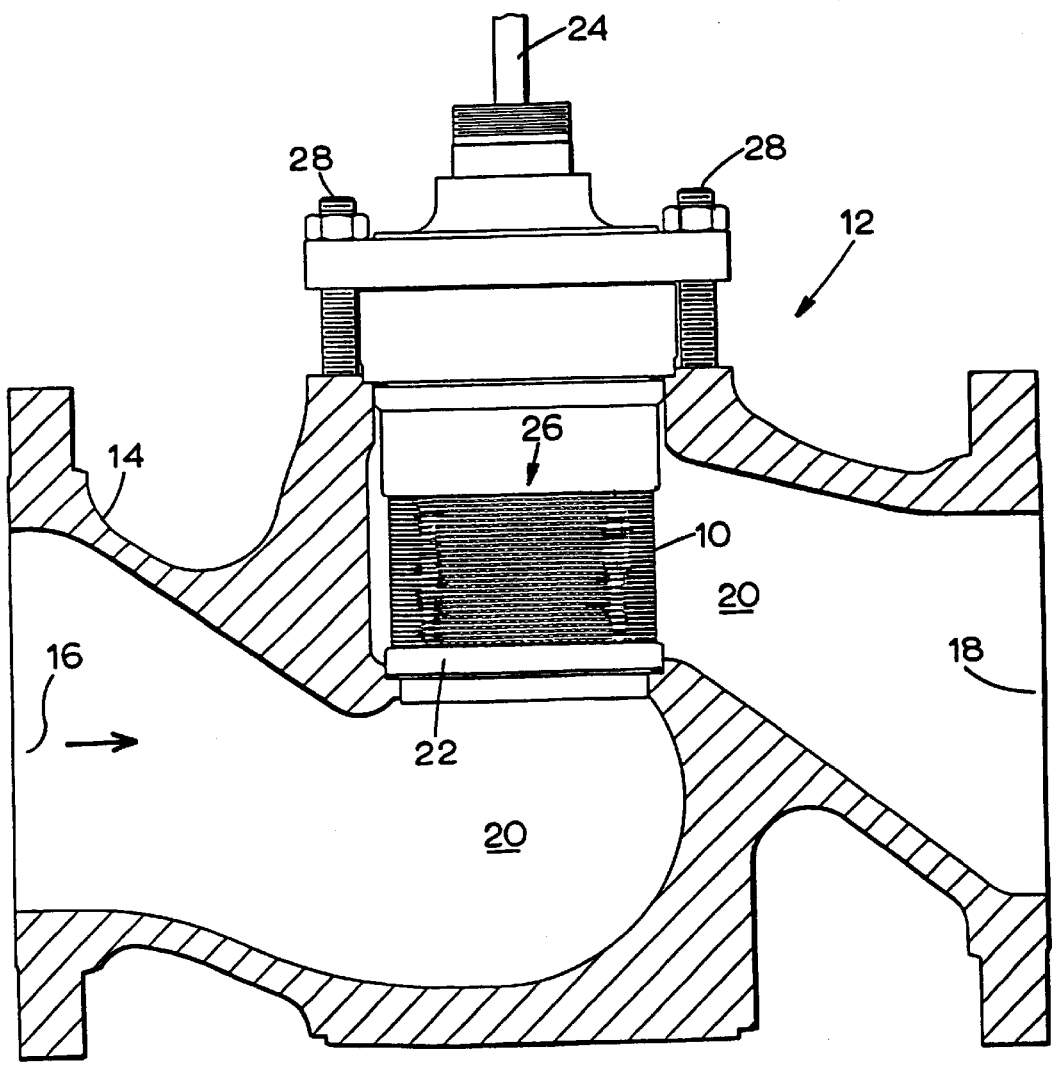
FIG. 1 is a cross sectional view illustrating a fluid control valve containing a valve trim in the form of assembled stacked disks forming fluid pressure reduction unit with a taper nut retention device.

Referring now to FIG. 1, there is illustrated a fluid pressure reduction device in accordance with the principles of the present invention in the form of a valve cage 10 having a plurality of stacked disks and mounted within a fluid control valve 12. Fluid control valve 12 includes a valve body 14 including a fluid inlet 16 and fluid outlet 18, and a connecting passageway 20 through the valve body.

The seat ring 22 is mounted within the valve body passageway 20 and cooperates with a valve operating member 24 to control fluid flow into the interior and through the exterior of the valve cage 10. The valve cage 10 be maintained within the valve by conventional mounting means such as a cage retainer 26 and mounting bolts 28 engaging the valve bonnet portion of the valve in a known manner.

It is to be understood that the description hereinafter of the taper nut retention of the present invention in connection with a stacked disk assembly in a fluid control valve is only for the purpose of illustrating the present invention. The present invention involving a taper nut retention and process for forming the stacked disks has applications beyond a fluid control valve, such as where the stacked disk assembly can be inserted into a pipeline, etc. Other applications of the taper nut retention of the present invention are described below after the following specific description of the stacked disks and taper nut retention shown in FIG. 2.

Figure 2:
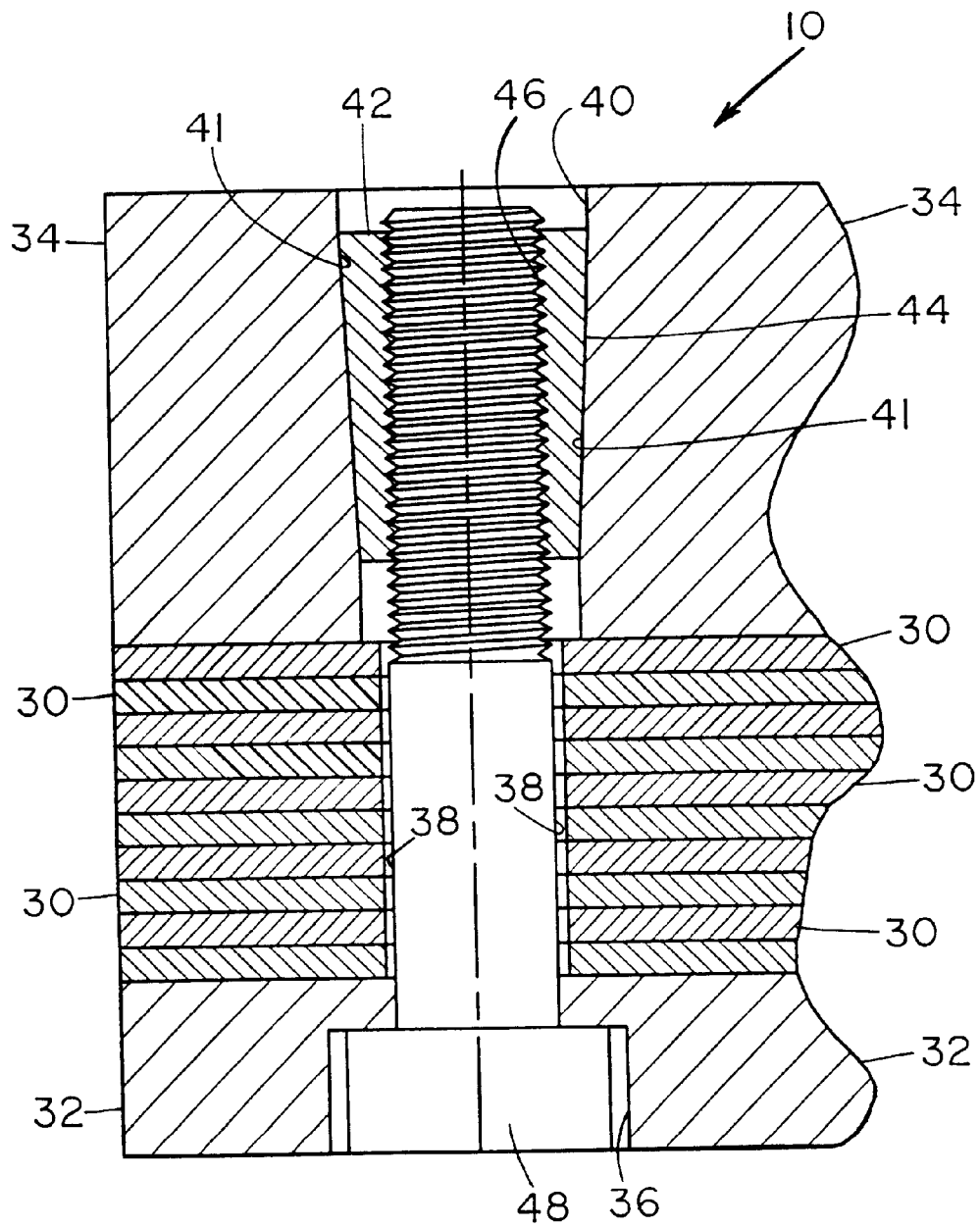
FIG. 2 is a fragmentary sectional view of a threaded taper nut, a tapered bore, and a threaded bolt mechanically fastening and maintaining the stacked disks securely assembled.

Referring to FIG. 2, the valve cage 10 includes a plurality of stacked disks 30 to provide flow attenuation of fluid entering the center of the stacked disks and exiting at the disk perimeter in a known manner. For instance, the aforementioned U.S. Pat. No. 6,026,859 describes an alternating disk configuration including a flow disk alternating with a plenum disk. Fluid can flow from the center of the stacked disks through a fluid inlet slot in a flow disk to plenum slots in adjacent plenum disks and to multiple fluid outlet slots in the flow disk. Other flow configurations are also provided so that the fluid flow path is split into two initial axial directions, then into the plenum slots with multiple radial flow directions, and then distributed through multiple outlet stage slots. It is understood of course that any other fluid pressure reducing stacked disk configuration can be provided for the disks 30 for use within the present invention.

Respective cage end mounting members 32, 34 are provided at opposite ends of the stacked disks 30. Cage end mounting member 32 includes a series of countersunk bores 36 which are aligned with respective holes 38 through each of the disks 30. Cage end mounting member 34 includes a series of inwardly converging, tapered bores 40 corresponding in number to each of the countersunk bores 36 and similarly aligned with the holes 38 in each of the stacked disks 30.

The tapered bore 40 can be formed in conventional manners, such as by a tapered reamer so that the wall surface 41 is inwardly converging at a shallow taper angle. The shallow taper angle should be less than 30 degrees. A taper angle of about five degrees is preferred.

A taper nut 42 is inserted into each of the tapered bores 40. The taper nut 42 includes a tapered outer surface 44 which matches the shallow taper angle of the inwardly converging wall surface 41 of the tapered bore 40. The taper nut 42 also includes a threaded interior bore 46. The tapered outer surface 44 is in close frictional engagement with the inwardly converging wall surface 41 of the tapered bore 40.

As shown in FIG. 2, a threaded bolt 48 is inserted into each of the countersunk bores 36 of the cage end 32 and through the disk holes 38 so as to threadably engage the threaded interior bore 46 of the taper nut 42. With a shallow taper angle, threading of the bolt into the nut is readily achieved without having to hold the nut from rotating. Continued threadable engagement of the bolt 48 and the taper nut 42 pulls the taper nut 42 deeper into the respective tapered bore 40 of the cage end 34. Standard torque wrenches can be used so that when the desired amount of torque is reached, the taper nut 42 is securely locked into the tapered bore 40 so that the valve cage 10 with stacked disks 30 is securely assembled.

The shallow taper angle enables a self-locking feature to be attained wherein the taper nut is locked in the tapered bore and will not fall out when the bolt is threadably disengaged. The taper nut can of course be punched out of the tapered bore if desired by suitably striking the end of bolt 48.

In the process of assembling the valve cage 10 in accordance with the present invention, the following steps are utilized. Each of the disks 30 and the end cage mounting members 32, 34 are coated with a nickel plating. The nickel plated disks and the nickel plated cage ends 32, 34 are assembled into a stack as shown in FIG. 2 and placed in a fixture. The assembled stacked disks and cage ends are placed in an oven in a brazing operation where the oven temperature is raised sufficiently to fuse the individual plated disks to each other as well as to the cage end mounting members 32, 34. Suitable stack loading may be applied during the brazing operation if desired.

After the brazing step, a taper nut 42 is inserted into each of the tapered bores 40 in the cage end 34. A respective threaded bolt 48 is then inserted into a respective countersunk bore 36 so as to threadably engage the taper nut 42, and the bolt and nut are tightened sufficiently to securely maintain the stacked disks assembled.

It is understood of course that FIG. 2 merely illustrates ten disks 30, whereas in normal fluid pressure devices, there can be, as an example, 50-200 disks in the stacked disk assembly. In any event, the use of the taper nut 42 and tapered bore 40 configuration along with the process of assembly of the present invention completely eliminates the prior assembly problems involving the difficulty in threading the bolt into a threaded cage end bore containing nickel which has been undesirably brazed onto the threads or where the threads have been distorted during brazing.

As can be seen from FIG. 2, the taper nut 42 is entirely within the tapered bore 40. Also, all of the retention components, i.e., the taper nut 42, the tapered bore 40, and the threaded bolt 48 are located within the confines of the stacked disk assembly and do not protrude beyond the outer surfaces of the mounting members 32, 34. Accordingly, the principles of this invention can be utilized in a configuration where it is desired to mechanically fasten two mounting members together without having the mechanical fastening device protrude or extend beyond the outer dimensions of the mounting members.

It is to be understood that in certain applications, if desired, the taper nut can be suitably sized so that one end of the taper nut can extend beyond the tapered bore.

Another application of the retention device of this invention is where a wrench or other tool cannot be used with standard nut fasteners due to restricted areas limiting access of the wrench to the nut.

A further application of the retention device of this invention is where the mounting members are of a material, such as ceramic, in which threads are difficult to form. Instead one need only form a tapered bore in, for instance, the ceramic mounting member, drop in a taper nut, and screw in a threaded bolt.

The foregoing detailed description has been given for clearness of understanding only, and no unnecessary limitations should be understood therefrom, as modifications will be obvious to those skilled in the art.

What is claimed is:

1. A mechanical fastening apparatus for fastening at least two mounting members together comprising:

respective bores through the mounting members, said bores aligned along a longitudinal axis;

one of the respective bores being a tapered bore having an inwardly converging tapered wall surface;

said tapered bore starting at an outer end of one of the mounting members and extending from said outer end inwardly converging towards an opposite inner end of said one mounting member to define said inwardly converging tapered wall surface continuously from said outer end towards said opposite inner end at a shallow taper angle less than thirty degrees;

a taper nut having a threaded interior and a tapered outer surface, the tapered outer surface matching the inwardly converging tapered wall surface of the tapered bore;

the taper nut insertable into the tapered bore with the tapered outer surface of the taper nut in engageable contact with the inwardly converging tapered wall surface of the tapered bore;

a threaded bolt insertable into the other of the respective bores and threadably engaging the taper nut, with continued threadable engagement urging the taper nut further within the shallow angle tapered bore to prevent undesired rotation of the taper nut during said continued threadable engagement to mechanically fasten the mounting members together; and said shallow taper angle enabling self-locking of the taper nut within the tapered bore upon said mechanical fastening of the mounting members to prevent the taper nut from falling out of the tapered bore when the threaded bolt is threadably disengaged from the taper nut.

2. A mechanical fastening apparatus according to claim 1, wherein the tapered wall surface and the tapered outer surface are at a taper angle of about five degrees.

3. A mechanical fastening apparatus according to claim 1, wherein the taper nut and the threaded bolt are located wholly within the outer dimensions of the mounting members.

* * * * *